106-77

United States Patent Office 3,183,107
Patented May 11, 1965

---

3,183,107
GLASS SPHERE FILLED PLASTERING COMPOSITIONS
Harvey E. Alford, Amherst, and Franklin Veatch, Lyndhurst, Ohio, assignors to The Standard Oil Company, Cleveland, Ohio, a corporation of Ohio
No Drawing. Filed Feb. 7, 1962, Ser. No. 171,600
8 Claims. (Cl. 106—110)

This invention relates to a plastering composition and more particularly to an improved plastering composition comprising a calcium sulfate hemihydrate, such as calcined gypsum, and, as a filler, hollow discrete spheres of synthetic fused water-insoluble alkali metal silicate based glass. This application is a continuation-in-part of copending application Serial No. 862,436, filed December 2, 1959, now U.S. Patent 3,030,215, which in turn is a division of application Serial No. 691,726, filed October 22, 1957, now U.S. Patent 2,978,340.

It is an object of this invention to formulate a plastering composition which requires the use of less water to obtain a mixture of suitable viscosity for trowel application.

It is a further object of this invention to formulate a plastering composition which after mixture with water, requires less drying time after application to a surface and which is particularly adapted for use under conditions of low temperature or high humidity.

It is a further object of this invention to prepare a plastering composition which yields a lower density plaster product and therefore causes a reduction in the overall weight of plaster-coated structures, thereby decreasing the strength requirements for structural supports.

It is an object of this invention to prepare a plastering composition which yields products that are harder than conventional plaster products and which exhibit improved resistance to compression, improved moduli of elasticity in compression, and also increased insulating and sound-deadening properties.

This invention makes use of the discovery that a unique plastering composition is obtained when a conventional calcium sulfate hemihydrate plaster such as commercial calcined gypsum plaster is filled with hollow glass spheres of the type described in application Serial No. 862,436.

One of the most significant features of the invention is that these hollow sphere-filled plastering compositions require less water to achieve a working viscosity suitable for application than do conventional calcined gypsum plasters. It is well known that for the highest strength product, the least possible amount of water should be mixed with the plastering composition. Sufficient water, however, must be added to achieve a mixture of low enough viscosity for trowel application. Conventionally, a plastering composition is mixed with about 50% by weight or over 100% by volume of water just prior to its application to a surface. Slightly less water is employed when gypsum blocks are to be fabricated, as, for example, in the building of walls not destined to carry loads, or in the building of roof slabs, or in fireproofing around columns. It has been found that plastering compositions filled with hollow spheres in accordance with this invention require substantially less water to reach a working viscosity. For example, a volume of calcined gypsum plaster containing 10% by weight of the hollow spheres requires less than one half of the volume of water needed with a similar volume of an unfilled plastering composition for a consistency suitable for trowel application, and the resultant product will have a density substantially less than that of the unfilled product. This surprising result is in contrast with the results obtained when calcined gypsum is filled with conventional fillers, such as sand or various fibrous structures. The conventional fillers either make no difference in the volume of water required to achieve a proper consistency or else, as is often the case, require an increased amount of water, due to their inherent tendency to absorb water.

Since less water is required for mixing, setting is more easily and quickly accomplished after the plastering composition of the invention has been applied. This factor is of importance in many situations where ambient temperatures are low, or humidities are high, and available heating equipment is inadequate.

One of the important measures of the strength of plaster products is the modulus of elasticity in compression. This modulus is a measure of the hardness of a material, and also a measure of the magnitude of the force required to cause the deformation of a surface, such as a wall surface, constructed from the plastering composition. The higher the value of the modulus of elasticity in compression, the more resistant the structure is to force applied against it. By the method of this invention, it is possible to obtain plaster products which exhibit higher moduli of elasticity in compression and hence are substantially stronger than products obtained through the use of conventional filled or unfilled calcined gypsum plaster.

The hollow glass spheres useful in this invention are of the type described in copending application Serial No. 862,436, filed December 2, 1959, and can be characterized as being hollow discrete spheres of synthetic, fused, water-insoluble alkali metal silicate-based glass. These spheres have solid walls of approximately uniform density and clear, smooth surfaces. They may be varied in size depending upon the size of the feed particles, the amount of gas-liberating agent, the temperature, etc. In general, the spheres will have a diameter within the range of 5 to 5000 microns and preferably 10 to 750 microns. Within the preferred range the average sphere diameter will usually be from about 75 to 200 microns. A typical mass of spheres for example, has particles within the size range of 10 to 350 microns with an average diameter of 100 microns.

The gas density of a mass of the spheres will vary to some extent with the density of the material from which they are formed, but to a larger extent with the ratio of the volume of the spheres to their wall thicknesses. Gas densities in the range of 0.1 to 0.75 gram per cubic centimeter have been achieved in accordance with the invention described in the parent application. For most purposes, lower densities are desirable and densities in the range of 0.25 to 0.45 gram per cubic centimeter are preferred. In the very low densities, the spheres tend to be more fragile because of the thinness of the walls. Within the preferred range, the spheres have adequate strength for most uses.

The wall thickness is very small. For instance, a sphere having a diameter of 350 microns and a gas density of 0.3 has a wall thickness of only 4 microns, which is only a little more than 1% of the diameter. In general, the wall thickness can be expressed as a percentage of the diameter of the spheres and will be about 0.5 to 10% thereof, preferably about 0.75 to 1.5% of the diameter in particles having a diameter of 10 to 500 microns.

As disclosed in the parent application, the hollow spheres used in the composition of this invention can be made from an alkali metal silicate which has the formula $(Me_2O)_x.(SiO_2)_y$. Various alkali metal silicates within the range where $x$ is 1, $y$ is 0.5 to 5 and Me is an alkali metal such as sodium, potassium, or lithium, have been found satisfactory. One alkali or a mixture of several alkali metals can make up the alkali metal portion. Sodium silicate is the preferred material since it is a low cost raw material readily available from various commerical sources in sufficient purity and uniformity from batch to batch. A typical example of a commercial sodium silicate which can be used in the process has the formula $Na_2O.(SiO_2)_{3.22}$. The alkali metal silicate will be referred to hereinafter as the basic feed material in the process. It is convenient to use it initially as an aqueous solution or slurry having a silicate content of 35 to 50 percent. The amount of water present is not critical since it is subsequently removed.

A silicate insolubilizing agent must be added to the basic feed material. Such insolubilizing agents render the hollow spheres more resistant to moisture. This agent can be selected from among the oxides of metals and metalloids, such as the oxides of zinc, aluminum, calcium, iron, boron, magnesium, or lead. Such oxide or oxides may be added directly to the feed material, or compounds which will readily decompose under heat to yield the desired oxide may be incorporated with the feed material. The latter method can be accomplished by the addition of such metal salts as carbonates or bicarbonates, i.e., calcium carbonate or bicarbonate, nitrates, halides, sulfates, hydroxides, such as aluminum hydroxide. The metal component can also be in the negative radical, such as in borates, such as borax and aluminates, such as potassium aluminate. In such case, the alkali metal in the silicate may be correspondingly reduced. The use of such oxides or oxide-forming compounds is well known in the glass and ceramics industry, and any standard text in this field explains their function and the properties they impart in forming a water-insoluble glass-like composition upon fusion of the same with an alkali metal silicate. The amount of silicate insolubilizing agent may vary, depending on its composition and the degree of water desensitization required. The above texts explain this. Generally, the amount used will be from about 0.5 to 10% based on a 40% solution of sodium silicate. Boric acid and boric oxide are the preferred silicate insolubilizing agents in that they also appear to have the effect of lowering the required fusion temperature.

The composition containing the silicate and the insolubilizing agent should be so selected as to ingredients and proportions as to give a molten glass mixture having a high viscosity at a fairly low fusion temperature and a high surface tension. The word "glass" as used herein with reference to composition is intended to refer to the fusion product of an alkali metal silicate with an oxide, said product having an amorphous form, being insoluble in water and otherwise having the known properties of glass, although not necessarily being transparent. The silicate and the oxide are referred to herein as glass-forming ingredients.

In order to achieve spheres of very low density, it is necessary to add to the composition a compound or compounds which will liberate a gas at about the fusion temperature of the glass-forming composition. If the gas is liberated at too low a temperature, it is likely to be dissipated or become otherwise unavailable at the time when the particles fuse with the result that the particles will remain solid. On the other hand, if the gas is not liberated at or prior to the fusion temperature, the particles will also remain solid. The amount of gas liberating agent employed need not be large, generally from 0.1 to 5% by weight based upon the weight of the glass-forming solution can be used. An amount of 0.5 to 2% is usually preferred, depending upon the amount of gas capable of being liberated. Unduly large amounts of gas are to be avoided since they cause the expanding particles to burst with resultant collapse and fusion in the solid state. There are a large number of liquid and solid substances which can be used as gas liberating agents.

Typical of these substances are salts selected from the group consisting of carbonates, nitrates, nitrites, azides, carbamates, oxalates, formates, benzoates, sulfates, sulfites, and bicarbonates such as sodium bicarbonate, sodium carbonate, ammonium carbonate, sodium nitrate, sodium nitrite, ammonium chloride, ammonium carbamate, ammonium bicarbonate, sodium sulfite, calcium oxalate, magnesium oxalate, sodium formate, ammonium benzoate, ammonium nitrite, zinc sulfate, zinc carbonate, aluminum sulfate, and aluminum nitrate. Typical of organic compounds are urea, dimethylol urea, biuret, melamine, trinitrotoluene, mellitic acid, glycerin, aniline p-sulfonic acid, trimethyl glycine, adipic acid, aminoquinoline, nitroaminobenzoic acid, nitrobenzonitrile, 5-methylresorcinol, pentaglycerol, pyridine dicarboxylic acid, thiophene carboxylic acid, tetrabromoaniline, trihydroxyanthroquinone, and Carbowax 1000.

The three components of the feed composition can be intimately mixed by any known procedure and subdivided into small particles. For example, the three components can be suspended or dissolved in a suitable liquid, and thereafter thoroughly mixed, and after removal of the liquid, as by evaporation, ground and if necessary, classified. The feed particle diameter can range in size from about 5 to about 2500 microns, although for economic reasons particles of a diameter not exceeding 500 microns ordinarily would be used. The economic limits of feed particle size depend largely upon the flexibility or range of operating conditions of the furnace used in the process. For any one particular batch it will be highly advantageous to use a feed of as narrow a particle size range that can economically be obtained. Otherwise, widely varying sizes of particles will require such highly different heat requirements for conversion to hollow spheres that it will be much more difficult to find optimum operating conditions for the furnace. By use of a narrow range of feed particle sizes, a more uniform product can be obtained in higher yields. The specific particle size range to be used also will be determined in part by the ultimate properties desired.

It is preferred to introduce the particulate mixture comprising the basic feed material, the gas liberating agent, and the silicate-insolubilizing agent as a dry or substantially dryer material which need be completely anhydrous, in a heated zone where the particles can be suspended in a hot gas stream and there be caused to fuse and expand. Many types of equipment can be used in this stage including the furnace disclosed in Patent No. 2,978,339 which is based upon an application filed of even date with the application upon which Patent No. 2,978,340 issued. This furnace utilizes an updraft prinicple where the feed particles are introduced at or near the bottom of the furnace in an ascending column of hot gases. In such a furnace the particle settling rate in the gas is a balance of the buoyancy exerted on the particle by the upward velocity of the gas against the particle mass and volume or density. In this manner the particle receives heat in direct relationship to the requirements of heat necessary to fuse and expand it to a hollow sphere. This furnace permits the economical use of a feed of somewhat wider particle size range than might otherwise be the case.

The main process variables for a furnace of this type are temperature and particle residence time. The temperature is selected in accordance with the fusion temperature of the feed mixture. This temperature must be sufficiently high to melt the solid particles but be maintained as low as possible to minimize costs and to facilitate process control. Temperatures within the range of 100° to 2500° F. can be used, depending on the feed employed and residence time.

The particle residence time in the furnace becomes primarily a function of feed particles size and the total flow of gases through the furnace. Accordingly, the residence time for any given size apparatus may be adjusted to an optimum for the particular feed mixture and particle size range by varying the total flow of gases through the furnace. The operating conditions are adjusted so that the feed particles remain suspended in the hot region of the furnace for a time adequate to fuse and expand the particles to hollow spheres and are then carried upward in the ascending column of hot gases out of the high temperature zone of the furnace into levels of progressively lower temperatures so that the outer skin has time to substantially solidify without danger of rupture during product collection. The particles move out with the stream of gases into the cooler regions of the furnace to be collected either at the bottom of a chamber which surrounds the high temperature zone of the furnace, or the particles may remain in the ascending gases and pass overhead from the cooling zone in a separating zone where the particles are separated from the gases and collected. Residence times of 0.5 to 10 seconds are generally employed.

As indicated, the material entering the furnace is usually relatively dry. Generally it should not contain more than 20% by weight of moisture. Preferably it should contain about 3% or less of moisture by weight. The higher the water content, the greater the heat requirements in the fusing step. In addition, a lower moisture content will usually result in more satisfactory hollow spheres. The material can be dried by conventional methods, as for example, by heating in an air oven at a temperature well below its fusion temperature prior to introduction to the furnace.

EXAMPLE A

This example represents the method of producing the hollow spheres which are thereafter to be used in the composition of this invention. The feed composition was made by forming a slurry of a sodium silicate solution containing 40% sodium silicate $Na_2O.(SiO_2)_{3.22}$ to which had been added 5.6% boric acid and 1% urea, based on the weight of the sodium silicate solution. The slurry was stirred until uniform and spread out in pans one inch thick and dried in an oven at a temperature of 580° F. for 16 hours. The dried material which had a moisture content of 3% was ground and classified by screening. All particles having a diameter of less than 250 microns were retained as feed material. These particles had an average diameter of 60 microns.

The feed material was fed into a vertical tubular furnace having an updraft flow of the type described above at a rate of 2 pounds per hour in a furnace having a diameter of 10 inches and a height of 32 inches. The temperature within the furnace was 2000° F. and the average residience time of the particles was 2 seconds.

The particles were collected after their exit from the top of the furnace and were found to vary in size from 10 to 350 microns with an average diameter of 100 microns and a gas density of 0.30 gram/ml. The walls of the particles were clear and transparent and free from bubbles. All of the particles were hollow and uniform in appearance and varied only as to size within the above range.

In the preparation of the plastering compositions of this invention, the hollow glass spheres are mixed with calcium sulfate hemihydrate which is generally in the form of finely divided calcined gypsum. Gypsum is a dihydrate of cacium suphate. Large deposits of gypsum rock in many different forms are found in many locations throughout the world. Alabaster, selenite and satin spar are forms of naturally occurring essentially pure gypsum. Gypsite is the most common natural product and contains from about 60 to 90% pure gypsum. There are also mixed deposits of gypsum sands. When gypsum from any of these sources of raw material is calcined by heating groove 212° F., a portion of the water of crystallization is driven off, and the water-soluble hemihydrate of calcium sulfate is formed. The hemihydrate, when ground into fine particles, is capable of recombining with water, forming the water-insoluble dihydrate of calcium sulfate. It is this chemical change from the hemihydrate to the dihydrate that is made use of in conventional plastering operations, and in this specification and claims, the term "calcined gypsum" is used to refer to this hemihydrate, prepared from any of the above-mentioned raw materials by calcining. In pastering operations, water is added to the hemihydrate, and the mixture applied to a surface, which is then permitted to react to form the dihydrate. Calcium sulfate hemihydrate prepared by methods other than calcination can of course be used.

For some applications, it is desirable, in order to achieve a uniform-setting product, to add to the plastering composition a small amount, generally from 0.01 to 0.05% by weight, of a deliquescent salt such as calcium chloride, during or after the calcination step.

Most conventional wall plastering compositions are made by mixing calcined gypsum with various mixtures of sand, wood fiber, animal hair and, where necessary, a retarder for controlling the set. Such retarders are used where large amounts of sand are employed since sand and other foreign materials often have the effect of accelerating the setting of gypsum plasters.

Gypsum wall boards are conventially made by forming a mixture of plaster with wood dust, stable foam or other light filler between two sheets of structural paper. While wet, the board is ironed to a uniform thickness, is allowed to set, is cut to desired lengths and then dried.

Such non-load bearing items as partition tile, floor tile, and roof tile are made of gypsum together with a more fibrous material such as shredded excelsior.

In all of the above applications as well as in any other applications involving the use of plastering compositions, use of the hollow spheres in accordance with this invention in place of all or part of the fillers conventionally employed will yield improved results.

Preferably, the hollow spheres are mixed with the calcium sulfate hemihydrate, such as calcined gypsum, while the latter is in the solid state. A simple physical mixing of the two components is sufficient to yield satisfactory results. Generally, as little as 1% by weight will show improved results. Optimum strength properties are obtained using from about 1% to about 9% by weight or, on a volume basis, from about 5% to about 40%. Amounts of hollow spheres of more than about 15% by weight of the plastering composition are not usually required, since the improvement in properties obtained is not commensurate with the additional cost.

The following examples in the opinion of the inventors represent the best embodiments of their invention.

EXAMPLES 1 TO 5

Five plastering compositions were prepared from commercial calcined gypsum plaster and varying amounts of hollow glass spheres prepared in accordance with Example A, by physically mixing the two components in the dry state until the mixture appeared visually homogenous. A sixth composition containing gypsum plaster was retained, but as a control. Water was added to each composition with agitation until the composition attained the minimum working viscosity suitable for trowel application to a wall surface.

The proportion of hollow glass spheres and the amount of water required are indicated in Table I. The amount of water required was calculated on the basis of the minimum volume of water required per unit bulk volume of the plastering composition in the dry state since this calculation would be of the greatest significance in actual use. For comparison, both the bulk volume and the true volume percentages of hollow glass spheres in the dry plastering composition are listed in Table I.

TABLE I

| Example Number | Wt. Percent Glass Spheres (Filler) | True Volume Percent Glass Spheres (Filler) | Bulk Volume Percent Glass Spheres (Filler) | Volume Water Per Unit Bulk Volum of Solids |
|---|---|---|---|---|
| Control | 0 | 0 | 0 | 0.905 |
| 1 | 1.76 | 10.5 | 14.1 | 0.787 |
| 2 | 3.67 | 19.9 | 27.0 | 0.652 |
| 3 | 6.45 | 31.0 | 38.8 | 0.539 |
| 4 | 9.69 | 41.5 | 49.7 | 0.432 |
| 5 | 13.86 | 51.5 | 59.7 | 0.335 |

It is apparent from the data that the amount of water required to achieve the requisite working viscosity for trowel application of the plastering composition decreases as the proportion of hollow glass sphere filler increases.

The six plastering compositions were each applied to a surface to form a plaster layer one inch thick. The surface was allowed to set at room temperature for four to six hours. Samples were then aged for thirty days before testing to conform to standard practice in the industry. Portions of each plaster layer were then removed and tested for density, ultimate compressive strength, modulus of elasticity, percent strain at failure and thermal conductivity. The data obtained are recorded in Table II.

TABLE II

| Example | Control | 1 | 2 | 3 | 4 | 5 |
|---|---|---|---|---|---|---|
| Weight percent hollow glass sphere filler in the dry plastering composition | 0 | 1.76 | 3.67 | 6.45 | 9.69 | 13.86 |
| Density of plaster, lb./cu. ft. | 103.0 | 104.3 | 91.15 | 81.78 | 72.42 | 66.80 |
| Ultimate compressive strength, p.s.i. | 3,650 | 3,220 | 3,710 | 3,400 | 2,480 | 1,820 |
| Modulus of elasticity, p.s.i.$\times 10^5$ | 4.12 | 5.87 | 6.15 | 4.69 | 3.74 | 2.30 |
| Percent strain at failure | 1.43 | 1.26 | 0.92 | 1.16 | 1.11 | 1.10 |
| Thermal conductivity, B.t.u./hr./sq. ft./° F./inch | 4.54 | 4.39 | 4.51 | 3.99 | 3.87 | 3.29 |

These examples show that within the tested range of hollow glass sphere content, the properties of the plaster product containing the filler will be superior to the unfilled product. The optimum filler content can be ascertained in any particular case from the moduli of elasticity. It will be noted the Examples 1, 2 and 3 actually showed higher moduli of elasticity than the unfilled product, the control. Example 4, however, showed a decrease in modulus. Thus, the optimum range of hollow sphere filler concentration in this case is from 1% to about 9% by weight of the dry plastering composition.

The improvement noted in modulus is not at the expense of the ultimate compressive strength of the samples. Over the optimum range of hollow sphere content, the ultimate compressive strength of the filled product does not differ greatly from that of the unfilled product. Example 2, it will be noted, actually shows a higher ultimate compressive strength.

It will be noted that the density of the products formed from the plastering composition of the invention diminishes as the filler concentration increases, thus leading to lighter weight products. Where a very low density product is desired, and the specifications for modulus of elasticity and ultimate compressive strength are not very high, it will often be expedient to use higher percentages of hollow sphere filler, for example, up to 15% by weight.

The percent strain at failure of the product is a good measure of the hardness thereof. The lower the percent strain, the harder the product. It will be noted from these examples that all of the products containing the hollow glass sphere fillers were harder than the unfilled product.

The insulating qualities of the plaster products were improved by the use of the hollow glass sphere fillers. This can be seen from the decrease in thermal conductivity of each filled product, as compared with the unfilled product.

Thus, by means of this invention it is possible to achieve a plaster product which is superior to unfilled plaster products in that it is stronger, harder, lighter in weight and a better insulator.

We claim:

1. A plastering composition requiring a relatively small amount of water to bring it to a working viscosity comprising calcium sulfate hemihydrate and, as a filler, from 1 to about 9% by weight of hollow, discrete spheres of synthetic, fused, water-insoluble alkali metal silicate-based glass, said hollow spheres having solid walls of the same density throughout, and clear, smooth surfaces, diameters of from 5 to 5000 microns and wall thicknesses of from 0.5 to 10% of their diameters, a mass of said spheres having a gas density of 0.1 to 0.75 gram per cubic centimeter.

2. A composition as in claim 1, wherein the said hollow spheres are further characterized as having diameters of from 10 to 500 microns, an average diameter of from 75 to 150 microns, an average wall thickness of about 0.75% to 1.5% of their diameters, a mass of said spheres having a gas density of 0.25 to 0.45 gram per cubic centimeter.

3. A composition as in claim 1 wherein the hollow discrete spheres are the sole fillers.

4. A composition as in claim 1 wherein the calcium sulfate hemihydrate is in the form of finely divided calcined gypsum.

5. A method of increasing the hardness and thermal insulating properties of plaster products comprising incorporating in the plastering composition with calcium sulfate hemihydrate from 1 to about 9% by weight of a filler comprising hollow discrete spheres of synthetic, fused, water-insoluble alkali metal silicate-based glass, said hollow spheres having solid walls of the same density throughout, and clear, smooth surfaces, diameters of from 5 to 5000 microns and wall thicknesses of from 0.5 to 10% of their diameters, a mass of said spheres having a gas density of 0.1 to 0.75 gram per cubic centimeter.

6. a method as in claim 5 wherein the said hollow spheres are further characterized as having diameters of from 10 to 500 microns, an average diameter of from 75 to 150 microns, an average wall thickness of about 0.75% to 1.5% of their diameters, a mass of said spheres having a gas density of 0.25 to 0.45 gram per cubic centimeter.

7. A shaped plaster composition comprising calcium sulfate dihydrate and from 1 to about 9% by weight of hollow discrete spheres of synthetic, fused, water-insoluble alkali metal silicate-based glass, said hollow spheres having solid walls of the same density throughout, and clear, smooth surfaces, diameters of from 5 to 5000 microns and wall thicknesses of from 0.5 to 10% of their diameters, a mass of said spheres having a gas density of 0.1 to 0.75 gram per cubic centimeter.

8. The composition of claim 7 wherein the hollow discrete spheres are the sole fillers.

References Cited by the Examiner

UNITED STATES PATENTS

| 2,676,892 | 4/54 | McLaughlin | 106—86 |
| 2,797,201 | 6/57 | Veatch et al. | 260—2.5 |
| 3,030,215 | 4/62 | Veatch et al. | 106—40 |

TOBIAS E. LEVOW, *Primary Examiner.*

JOHN R. SPECK, *Examiner.*